United States Patent [19]
Drucker et al.

[11] 3,746,918
[45] July 17, 1973

[54] FOG REAR LIGHT

[75] Inventors: Gerhard Drucker, Stuttgart;
Reinhard Filsinger, Waiblingen,
both of Germany

[73] Assignee: Daimler-Benz Aktiengesellschaft,
Stuttgart-Unterturkheim, Germany

[22] Filed: May 24, 1971

[21] Appl. No.: 146,163

[30] Foreign Application Priority Data
May 23, 1970 Germany................... P 20 25 302.5

[52] U.S. Cl.................... 315/77, 315/156, 315/159
[51] Int. Cl.............................................. B60q 9/00
[58] Field of Search ................ 315/83, 82, 77, 158,
315/76, 156, 157, 159

[56] References Cited
UNITED STATES PATENTS

| | | | |
|---|---|---|---|
| 3,273,012 | 9/1966 | Rosenblum ..................... | 315/83 X |
| 2,614,227 | 10/1952 | Bordewieck et al. ............. | 315/83 X |
| 3,319,116 | 5/1967 | Schick ................... | 315/83 |
| 3,192,437 | 6/1965 | Meyer................... | 315/77 |
| 3,531,684 | 9/1970 | Nuckolls........................ | 315/156 X |

*Primary Examiner*—Nathan Kaufman
*Attorney*—Craig, Antonelli & Hill

[57] ABSTRACT

A fog tail light, especially for motor vehicles, in which the operating voltage applied across the fog lamp is varied as a function of the light intensity produced by headlights of a following vehicle in such a manner that in case of a high light intensity of the following headlights, the operating voltage is reduced and vice versa.

5 Claims, 3 Drawing Figures

Patented July 17, 1973

3,746,918

INVENTORS
GERHARD DRUCKER
REINHARD FILSINGER

BY Craig, Antonelli & Hill

ATTORNEYS

FOG REAR LIGHT

The present invention relates to a fog tail light and, more particularly, to a fog tail light for a motor vehicle which is automatically dimmed.

In order to assure in the fog an early recognition of vehicles driving ahead, both the minimum as also the maximum light intensity of fog tail lights were determined within a certain radiation range horizontally and vertically to the signal direction. If the light intensity is now within these limits, then a fog tail light fulfills its purpose in an excellent manner to enable recognition of a vehicle from a longer distance in fog. However, if a vehicle approaches another vehicle equipped with such a fog tail light, then the relatively high light intensity or brightness of the fog tail light leads to a blinding of the trailing driver, i.e., of the driver in the vehicle following the vehicle equipped with such a fog tail light. This is particularly critical since experience has demonstrated that the fog tail lights are turned on frequently already in case of very slight fog densities or during slight snow flurries.

The present invention is concerned with the task to eliminate the aforementioned disadvantages with the use of fog tail lights. The underlying problems are solved according to the present invention in that means are provided, with which the operating voltage for the incandescent lamp is adapted to be changed in dependence on the light intensity produced by the headlights on the fog tail light in such a manner that in case of a high light intensity the operating voltage is reduced and vice versa.

It is achieved in an advantageous manner by the present invention that the light intensity of the fog tail light decreases the closer a trailing vehicle with turned-on headlights follows so that the driver of this trailing vehicle is not blinded.

The means according to the present invention may consist in one embodiment of the inventive concept of a photo-transistor arranged preferably within the housing of the fog tail light, which can be reached by the light of the headlights and which is a component of a Schmitt-trigger circuit controlling a switching transistor, whereby parallel to the collector-emitter circuit of this switching transistor, which is in series with the incandescent light, a low-ohmic high-power resistor is provided.

In lieu of this arrangement, however, a photo-resistor adapted to be reached by the light of the headlights may be arranged also preferably within the housing of the fog tail light, which controls a power transistor connected in series with the incandescent lamp.

In order to preclude breakdowns and to detect only the light from headlights, which originates from a vehicle following at a predetermined distance, the photo-transistor or the photo-resistor may be arranged at the end of a tube whose inlet cross section is arranged within the area of the window pane closing off the housing of the fog tail light or within the same itself.

A transparent light disc may be arranged at the inlet cross section of the tube.

Accordingly, it is an object of the present invention to provide a fog tail light, particularly for motor vehicles, which avoids by simple means the shortcomings and drawbacks mentioned hereinabove.

Another object of the present invention resides in a fog tail light for vehicles which gives an early warning to trailing drivers of the presence of the vehicle without blinding the driver of such vehicle.

A further object of the present invention resides in a fog tail light of the type described above whose light intensity is adapted to be changed in dependence on the light intensity of the headlights of the following car.

Still another object of the present invention resides in a control circuit for a fog tail light of motor vehicles which is simple in construction, reliable in operation and can be readily incorporated into the fog tail light assembly.

These and other objects, features and advantages of the present invention will become more obvious from the following description when taken in connection with the accompanying drawing, which shows, for purposes of illustration only, two embodiments in accordance with the present invention, and wherein.

Figure 1:
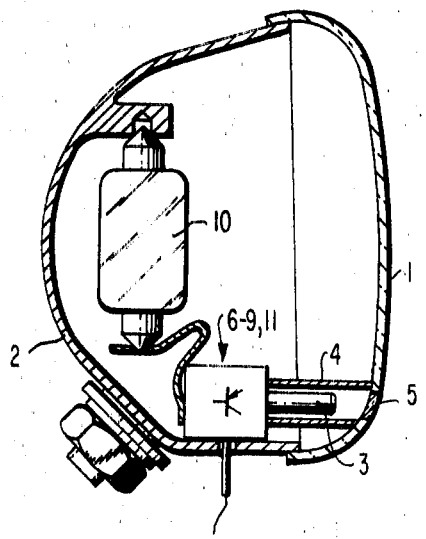
FIG. 1 is a cross-sectional view through a fog tail light in accordance with the present invention.
Figure 2:
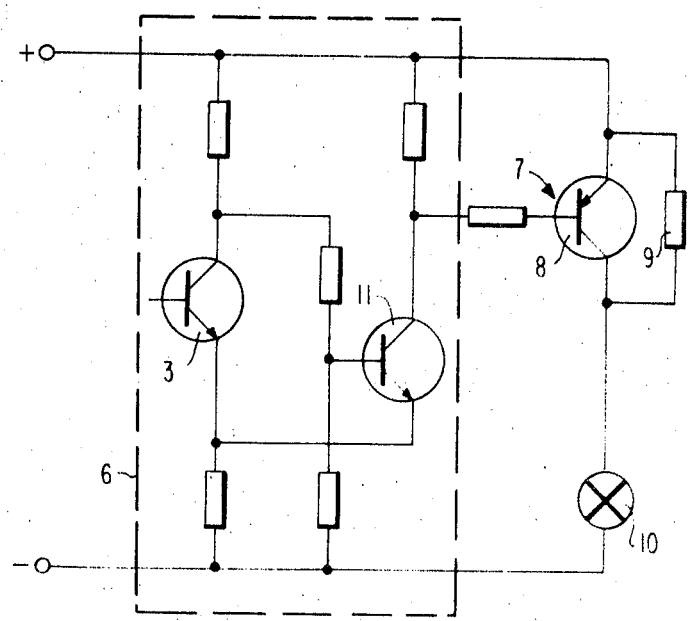
FIG. 2 is a control circuit for the tail light of FIG. 1.

Referring now to the drawing wherein like reference numerals are used to designate like parts and, more particularly, to FIGS. 1 and 2, a photo-transistor 3 of any conventional type is arranged within a tubular member 4 behind the light window pane 1 of the fog tail light 2 in such a manner that only light from the outside can impinge onto its surface. The window pane 2 is highly transparent within the area 5 where the light will enter into the tubular member 4.

The photo-transistor 3 is a component of a conventional Schmitt-trigger circuit 6, whose output controls a switching transistor generally designated by reference numeral 7. A low-ohmic, high-power resistor 9 is connected in parallel to the collector-emitter circuit 8 of the switching transistor 7. The light bulb 10 of the fog tail light, for example, an incandescent light 10, is connected in series with the parallel circuit consisting of the emitter-collector circuit 8 of the switching transistor and of resistor 9.

If the light intensity falling on the photo-transistor 3 does not exceed a predetermined value, then this photo-transistor is blocked, i.e., is non-conductive and therewith the other transistor 11 of the Schmitt-trigger circuit 6 as well as the switching transistor 7 are conductive. The incandescent light 10 of the fog tail light 2 is therefore connected to the full supply voltage less the voltage drop in the collector-emitter circuit 8 of the switching transistor 7. If the light intensity on the photo-transistor 3 now increases above a certain value, then the photo-transistor 3 becomes conductive and thereby renders non-conductive the other transistor 11 of the Schmitt-trigger 6. As a result thereof, also the switching transistor 7 is rendered non conductive, whereby the resistor 9 connected in parallel to the collector-emitter circuit 8 becomes effective and reduces the voltage applied across the incandescent lamp 10. The consequence thereof is a reduction of the light intensity of the fog tail light 2 by a constant amount depending on the value of the resistance 9 to a level which precludes the blinding of the following driver.

The arrangement of the photo-transistor 3 behind the light window 1 of the fog tail light 2 has the advantage that the light serving for the control undergoes the same attenuation in case of a soiled glass 1 as the light radiated by the incandescent lamp 10 and as a result thereof the current for the lamp 10 is therefore not attenuated in a non-permissive manner.

Figure 3:
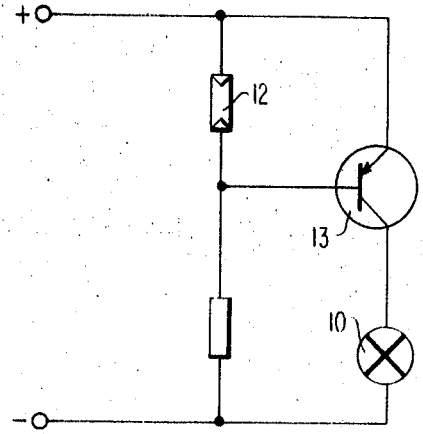
FIG. 3 is a modified embodiment of a control circuit for another fog tail light in accordance with the present invention.

In the embodiment, according to FIG. 3, a photo-resistor 12 of any conventional construction is disposed behind the window glass of a fog tail light in the same manner as the photo-transistor 3 according to FIGS. 1 and 2. The photo-resistor 12 controls a power transistor 13 which is connected in series with the incandescent lamp 10 of the fog tail light.

During slight illumination intensities on the photo-resistor 12, the resistance thereof is so large that the power transistor 13 is fully conductive. As a result, the incandescent lamp 10 is energized with the full operating voltage.

If the illumination intensity on the photo-resistor 12 now increases continuously, then its resistance decreases, the base of the power transistor 13 becomes positive, and as a consequence thereof the voltage drop in the collector-emitter circuit increases. A lower operating voltage is now applied across the incandescent lamp 10 and the light intensity of the fog tail light decreases correspondingly to the incandescent lamp characteristic.

A meaningful, continuous decrease of the light intensity of the fog tail light with constantly increasing lighting intensity on the photo-resistor can be achieved by a corresponding selection of the elements.

While we have shown and described only two embodiments in accordance with the present invention, it is understood that the same is not limited thereto, but is susceptible of numerous changes and modifications as known to those skilled in the art and we therefore do not wish to be limited to the details shown and described herein, but intend to cover all such changes and modifications as are encompassed by the scope of the appended claims.

We claim:

1. A fog tail light, especially for motor vehicles, in which an operating voltage is applied across an incandescent lamp, comprising a housing, an incandescent lamp mounted in said housing, and control means connected to said incandescent lamp for varying the operating voltage applied thereto in dependence on the light intensity produced by the headlights of another vehicle on the fog tail light in such a manner that with a high light intensity of the headlights the operating voltage applied to the lamp is reduced, said control means including photo-detector means mounted on said housing for detecting the level of light directed thereon, a transistor switching circuit including a control transistor responsive to said photo-detector means, and a resistor connected in series with said incandescent lamp and in parallel to the collector-emitter circuit of said control transistor.

2. A fog tail light as defined in claim 1 wherein said transistor switching circuit comprises a Schmitt trigger circuit with said photo-detector means being formed by a photo-transistor connected as one element of said Schmitt trigger, said control transistor being connected to the output of said Schmitt trigger.

3. A fog tail light with a housing according to claim 2, characterized in that the light-sensitive element is arranged at the end of a tubular member whose inlet cross section is disposed at least within the area of a glass window closing off the fog tail light housing.

4. A fog tail light according to claim 3, characterized in that the inlet cross section of said tubular member is arranged within the glass window closing off the fog tail light housing.

5. A fog tail light according to claim 4, characterized in that a transparent window is provided at the inlet of the tubular member.

* * * * *